US006393274B1

(12) United States Patent
Peltonen

(10) Patent No.: US 6,393,274 B1
(45) Date of Patent: May 21, 2002

(54) WIRELESS TELECOMMUNICATION SYSTEM HAVING SUBSCRIBER ADVANCED PERSONAL SERVICE

(75) Inventor: Miika P Peltonen, Oulu (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/327,935

(22) Filed: Jun. 8, 1999

(51) Int. Cl.$^7$ ................................................ H04Q 7/06
(52) U.S. Cl. ...................... 455/414; 455/412; 455/413; 455/418; 455/422; 455/437
(58) Field of Search .................. 455/412, 413, 455/417, 418, 422, 428, 458, 432, 435, 445, 439, 437, 414; 370/310, 338, 312

(56) References Cited

U.S. PATENT DOCUMENTS

| | | | |
|---|---|---|---|
| 5,175,758 A | | 12/1992 | Levanto et al. ............... 379/57 |
| 5,394,391 A | | 2/1995 | Chen et al. .................... 370/18 |
| 5,610,969 A | * | 3/1997 | McHenry et al. ............. 379/56 |
| 5,794,142 A | | 8/1998 | Vanttila et al. ............. 455/419 |
| 5,794,156 A | | 8/1998 | Alanara ...................... 455/517 |
| 5,819,174 A | | 10/1998 | Kyllonen .................... 455/414 |
| 5,845,203 A | * | 12/1998 | LaDue ........................ 455/414 |
| 5,890,064 A | * | 3/1999 | Wdergen et al. ............ 455/445 |
| 5,903,832 A | | 5/1999 | Seppanen et al. .......... 455/414 |
| 5,903,845 A | * | 5/1999 | Buhrmann et al. ......... 455/461 |
| 5,933,778 A | * | 8/1999 | Buhrmann et al. ......... 455/461 |
| 6,029,064 A | * | 2/2000 | Farris et al. ................ 455/412 |
| 6,151,491 A | * | 11/2000 | Farris et al. ................ 455/412 |

FOREIGN PATENT DOCUMENTS

| | | |
|---|---|---|
| EP | 0 717 574 A2 | 6/1996 |
| EP | 0 881 847 A2 | 12/1998 |
| WO | WO 97/22209 | 6/1997 |
| WO | WO 97/42780 | 11/1997 |
| WO | WO 98/26621 | 6/1998 |

\* cited by examiner

*Primary Examiner*—Thanh Cong Le
*Assistant Examiner*—Yemane Woldetatios
(74) *Attorney, Agent, or Firm*—Harrington & Smith, LLP

(57) ABSTRACT

The method has steps of (a) formulating a request in a mobile station (10) for a particular type of service (an Advanced Personal Service or APS request) that is offered by a network (32) for a particular subscriber or that is offered by another party; (b) transmitting the request to the network over a radio channel; (c) interpreting the request and, based on the interpretation, determining contact information (such as a telephone number of a data network address) for a destination location that will fulfil the request; and (d) using the determined contact information, connecting the mobile station to the destination location. In one embodiment the contact information is found in a database (33), while in another embodiment the contact information is created by modifying a telephone number sent with the request (e.g., the called subscriber's normal telephone number) into a second telephone number (e.g. the called subscriber's voice mail number). In a first embodiment the request is transmitted prior to transmitting a call connect setup message from the mobile station to the network, and in another embodiment the request is transmitted as a part of the call connect setup message. The formulating step can display a menu to the user, and information conveyed by the transmitted request is based at least in part on the type of menu that was displayed and on the user's interaction with the displayed menu.

38 Claims, 5 Drawing Sheets

MS 10                                                    NETWORK, 32
I-SIGNAL — — — — — — — — — — — — — — — — — — — →
CHANNEL RELEASE — — — — — — — — — — — — — — →

FIG.3

MS 10                                                    NETWORK, 32
I-SIGNAL — — — — — — — — — — — — — — — — — — — →
← — — — — — — — — — — — — — — — — — — — — IACK SIGNAL
CC SETUP — — — — — — — — — — — — — — — — — — →
← — — — — — — — — — — — — — — CHANNEL RELEASE
                                (CAUSE=REQUESTED
                                APS NOT PROVIDED
                                BY THE CALLED
                                PARTY)

FIG.4

MS 10                                                    NETWORK, 32
I-SIGNAL — — — — — — — — — — — — — — — — — — — →
← — — — — — — — — — — — — — — — — — — — — IACK SIGNAL
CC SETUP — — — — — — — — — — — — — — — — — — →
← — — — — — — — — — — — — — — CALL PROCEEDING
                                (THE CALL IS
                                CONNECTED TO
                                REQUESTED APS OF
                                THE CALLED PARTY)

FIG.5

MS 10                          NETWORK, 32

I CC SETUP ------------------------→

CHANNEL RELEASE ---------------→

FIG.6

MS 10                          NETWORK, 32

I CC SETUP ------------------------→

←------------------------ CALL PROCEEDING

←------------------------ CHANNEL RELEASE (CAUSE=REQUESTED APS NOT PROVIDED BY THE CALLED PARTY)

FIG.7

MS 10                          NETWORK, 32

I CC SETUP ------------------------→

←------------------------ CALL PROCEEDING (THE CALL IS CONNECTED TO THE REQUESTED APS OF THE CALLED PARTY)

FIG.8

WIRELESS TELECOMMUNICATION SYSTEM HAVING SUBSCRIBER ADVANCED PERSONAL SERVICE

FIELD OF THE INVENTION

This invention relates generally to wireless telecommunications systems and, in particular, to those having mobile stations or subscribers that offer services or information to calling parties.

BACKGROUND OF THE INVENTION

In current wireless telecommunications systems that are known to the inventor, there is no straightforward way in which to access a service or information that an individual mobile subscriber may be willing to offer to the public via his or her mobile telephone number.

As an example, consider the case of calling unconditionally to a particular mobile subscriber's voice mail service that is provided by that subscriber's network operator. Assume that person A wishes to unconditionally leave a voice mail message in the voice mail of target subscriber B. That is, assume that person A wishes the call to go to subscriber B's voice mail, regardless of whether subscriber B has call forwarding to his voice mail set on or off.

In order to make the call to the mobile subscriber B's voice mail from a typical mobile phone the following procedure would be used. First the caller fetches the desired subscriber B's regular mobile telephone number from the memory of the mobile station (assuming that it has been stored in the memory). Next, the recalled number can be edited to the number of the target subscriber B's voice mail number (e.g., by changing one or more predetermined digits to another digit). The edited number is then dialled to enable the caller to leave the voice mail message in the target subscriber's answering machine resource provided by the network operator.

However, the execution of the foregoing procedure includes the following problems. First, the actual editing of the telephone number may be tedious, as the caller has to fetch the number, choose options (i.e., Edit), move to the digit(s) to be changed, clear the digit(s) and then input a new digit or digits. Only after this procedure will the call reach subscriber B's voice mail unconditionally.

Second, the caller may accidentally overwrite the original number with the edited number.

Third, if subscriber B's number was not in the memory of the caller's mobile station, then the caller is required to remember and manually enter the subscriber B' voice mail number.

Fourth, different network operators typically have different ways to indicate that the desired service is not subscriber B's regular mobile number, but is instead subscriber B's voice mail number. If the selection of service (unconditional access to subscriber B's voice mail) is done manually by the caller, then the caller must know subscriber B's operator, as well as the operator's standard way in which to specify subscriber B's voice mail. As but one example, the voice mail of a subscriber of Telecom Finland can be accessed unconditionally by changing the first actual digit of the subscriber B's phone number to an 8 if it is a 5. However, other network operators may use another digit to differentiate the regular mobile telephone number from that subscriber's voice mail number.

In a related manner, over time network operators may change their standard indications for unconditional access to voice mail. As such, even if the caller is able to memorize the procedures for several network operators, there is no guarantee that these procedures will not change.

OBJECTS AND ADVANTAGES OF THE INVENTION

It is a first object and advantage of this invention to provide methods and apparatus for accessing information and/or a service offered by or otherwise associated with a particular subscriber, that overcomes the foregoing and other problems.

It is another object and advantage of this invention to provide Advanced Personal Service (APS) methods and apparatus for enabling a user of a mobile station to generically specify a desired service or type of service, and to which the network responds by connecting the user to a desired destination where the desired service or type of service can be found.

SUMMARY OF THE INVENTION

The foregoing and other problems are overcome and the objects of the invention are realized by methods and apparatus in accordance with embodiments of this invention.

A method for operating a wireless telecommunications system is disclosed, as is a system that operates in accordance with the method. The method has steps of (a) formulating a request in a mobile station for a particular type of service (an Advanced Personal Service or APS request) that is offered by a network for a particular subscriber or that is offered by another party; (b) transmitting the request to the network over a radio channel; (c) interpreting the request and, based on the interpretation, determining contact information (such as a telephone number or a data network address) for a destination location that will fulfil the request; and (d) using the determined contact information, connecting the mobile station to the destination location. In one embodiment the contact information is looked up in a database, while in another embodiment the contact information is created by modifying a telephone number sent with the request (e.g., the called subscriber's normal telephone number) into a second telephone number (e.g. the called subscriber's voice mail number).

In a first embodiment the request is transmitted prior to transmitting a call connect setup message from the mobile station to the network, and in another embodiment the request is transmitted as a part of a call connect setup message sent from the mobile station to the network. The request is comprised of at least one bit (a Header field) for indicating that the request is a request formulated by the mobile station for a particular type of service, and a plurality of bits (an Information field) for indicating the type of requested service.

In a preferred embodiment the step of formulating comprises a step of displaying a menu to the user, and information conveyed by the transmitted request is based at least in part on the type of menu that was displayed and on the user's interaction with the displayed menu.

BRIEF DESCRIPTION OF THE DRAWINGS

The above set forth and other features of the invention are made more apparent in the ensuing Detailed Description of the Invention when read in conjunction with the attached Drawings, wherein:

FIGS. 3–8 are signaling drawings of the different implementation methods for this invention, wherein FIGS. 3–5 relate to an Indication signalling (I-signaling) embodiment of this invention, while FIGS. 6–8 relate to an embodiment of this invention that places an Indication field (I-field) in a Call Control (CC) Setup Message.

DETAILED DESCRIPTION OF THE INVENTION

Figure 1:
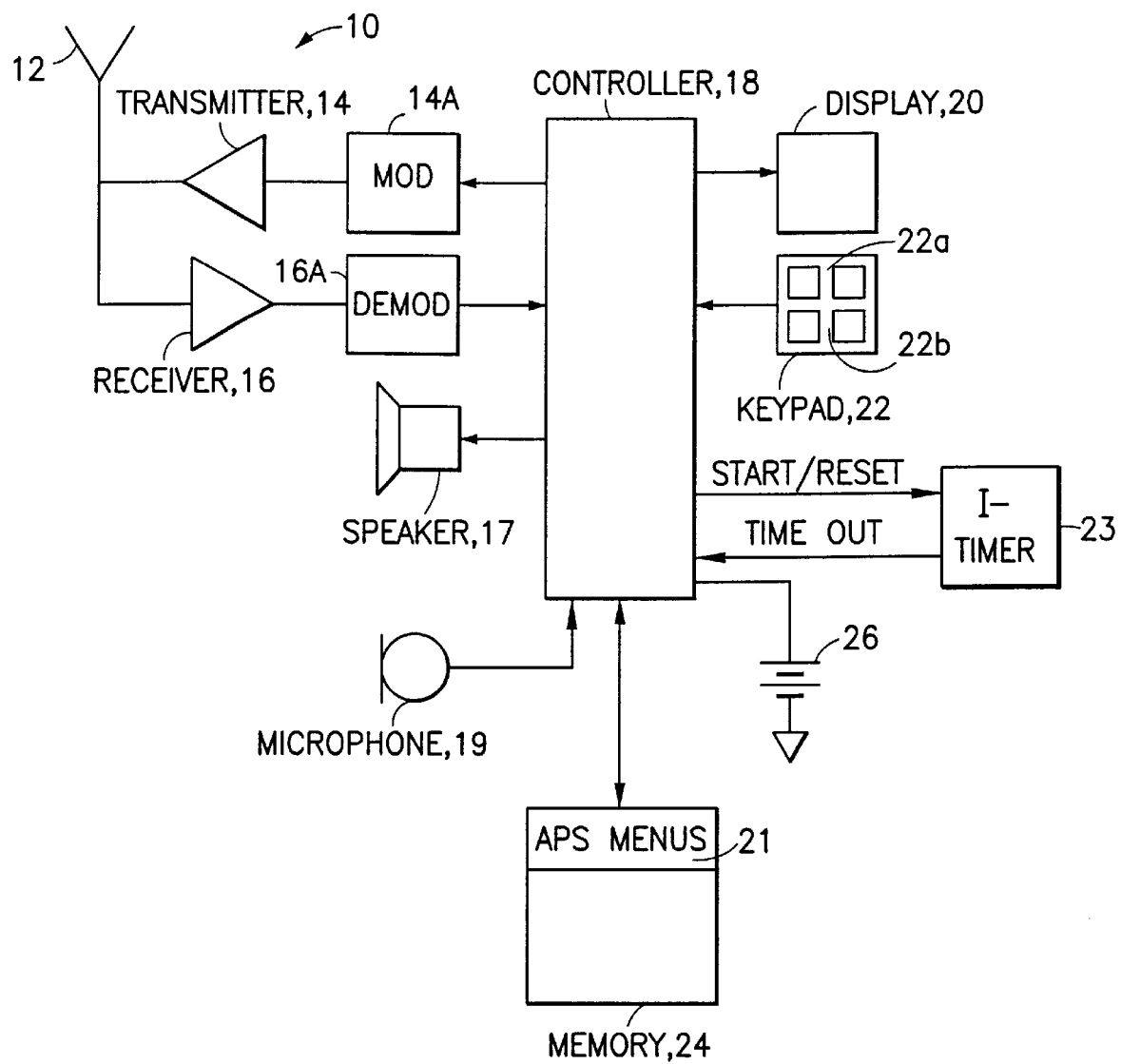
FIG. 1 is a block diagram of a mobile station that is constructed and operated in accordance with this invention.
Figure 2:
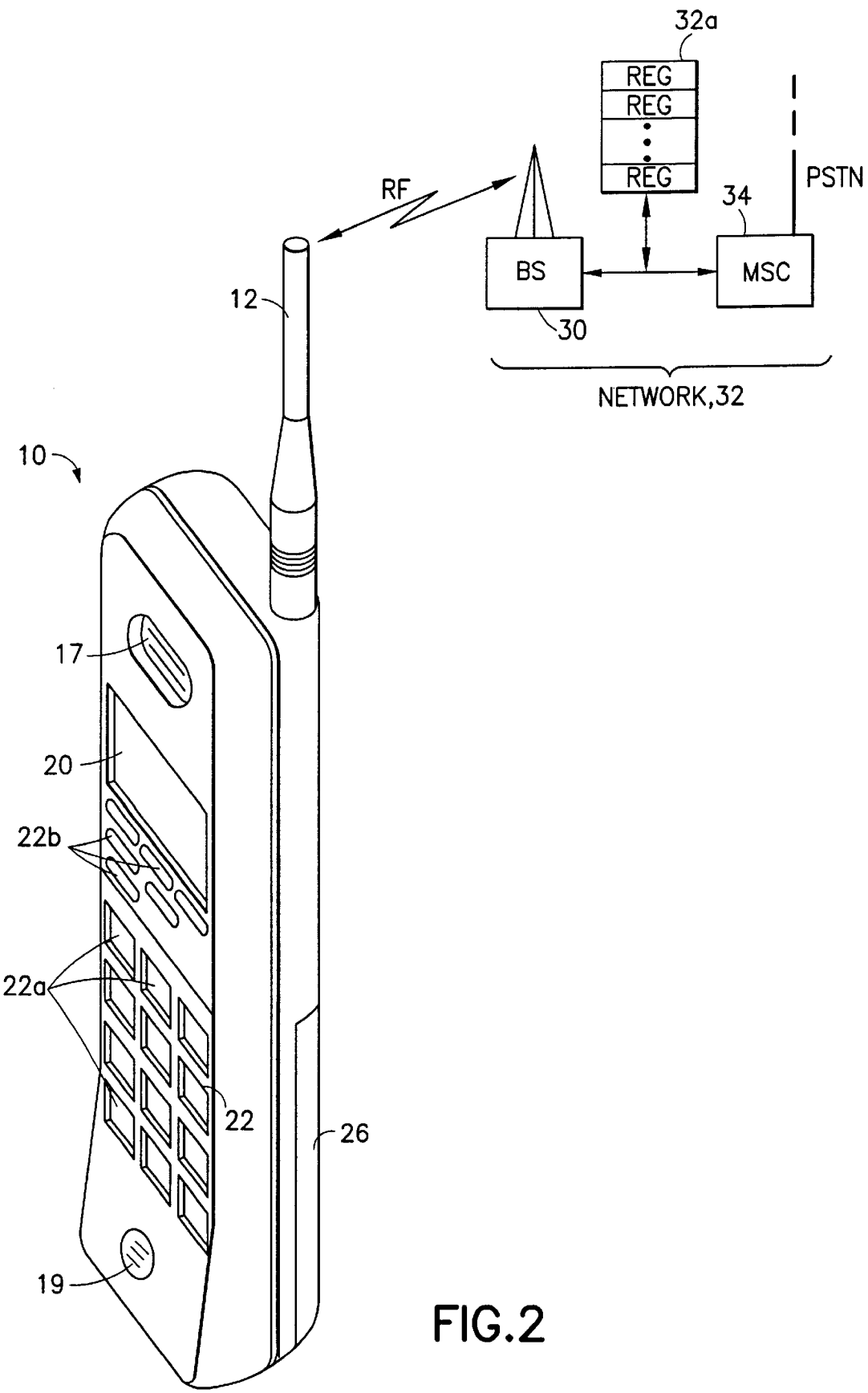
FIG. 2 is an elevational view of the mobile station shown in FIG. 1, and which further illustrates a wireless telecommunication system or network to which the mobile station is bidirectionally coupled through wireless RF links.

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a wireless telecommunications system or network 32, that may include a mobile switching center (MSC) 34 or some similar interface. In general, the MSC 34 provides a connection to landline trunks, such as the public switched telephone network (PSTN), when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable wireless system, and also user speech and/or user generated data.

It is noted that the particular air interface standard and/or access type is not germane to the operation of this system, as mobile stations and wireless systems employing most if not all air interface standards and access types (e.g., TDMA, CDMA, wideband CDMA (WCDMA), etc.) can benefit from the teachings of this invention. As such, and although the invention will be described below in the context of a Global System for Mobile Communications (GSM) embodiment, those skilled in the art should appreciate that these teachings can be adapted to a number of other different types of wireless communications systems and protocols.

With specific regard to GSM terminals and networks, reference can be had to "The GSM System for Mobile Communications", by Michel Mouly and Marie-Bernadette Pautet, 1992, which is incorporated by reference in its entirety.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station 10 are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10.

These other keys 22b may include, by example, a SEND key, various menu scrolling and soft keys, and a PWR key. The mobile station 10 also includes a battery 26 for powering the various circuits that are required to operate the mobile station. The mobile station 10 also includes various memories, shown collectively as the memory 24, wherein are stored a plurality of constants and variables that are used by the controller 18 during the operation of the mobile station. The memory 24 may also store all or some of the values of various wireless system parameters and the number assignment module (NAM). An operating program for controlling the operation of controller 18 is also stored in the memory 24 (typically in a ROM device).

The teachings of this invention enable a person to access information or services that an individual mobile station or terminal subscriber is willing to offer, by using only one access key or address. This address is the offering subscriber's mobile phone number, a number found in the Called Party BCD Number field. In general, this enhanced ability to access the information or services offered by a mobile subscriber is referred to herein as Advanced Personal Services, or APS.

In the GSM embodiment referred to above the existing GSM signaling is altered by adding an Indication field (I-field) or by adding a new Indication signal (I-signal) and an appropriate response signal. The Indication informs the network 32 that the caller does not intend to create a normal speech or data call to the subscriber number specified in the Called Party BCD Number field, but instead desires to obtain entry to the service, identified by the new Indication, that is offered by the called subscriber.

For example, a person desiring to access a certain service of a known mobile subscriber selects and enters an appropriate menu that is displayed on the display 20 of the mobile station 10, and dials the offering subscriber's Called Party BCD Number. Depending on which menu the call was initiated or originated from the operator or network 32 connects the caller to the desired service provided by the called party.

Figure 9:
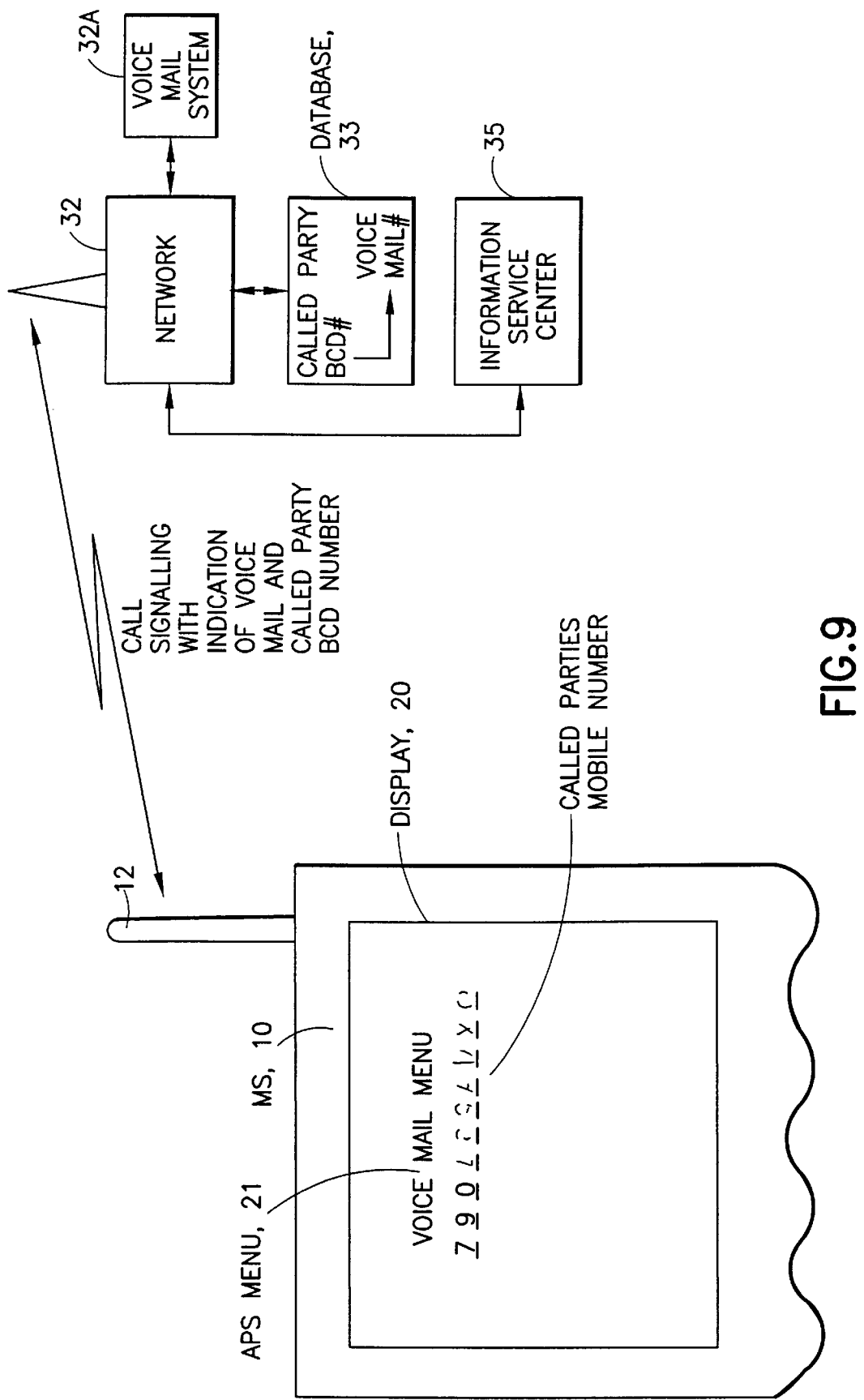
FIG. 9 is a block diagram that shows the interaction of the mobile station and network in greater detail.

Further by example, and referring to FIG. 9, if the call is initiated from a Voice Mail menu 21, and if the caller dials the called parties or subscriber's mobile telephone number, then the controller 18 of the mobile station 10 arranges the signalling such that the Indication specifies that the call originated from the Voice Mail menu 21, and the Called Party BCD Number corresponds to the called parties mobile number that was manually entered into the menu 21, or that was recalled from the memory 24 (e.g., from a conventional phonebook or speed dial function). In any case the network 32 is informed from the Indication that the user of the mobile station 10 is attempting to reach the voice mail system 32A for the subscriber, and is not placing a call to the subscriber's mobile terminal that corresponds to the Called Party BCD Number. In this case the network 32 can lookup the desired voice mail box number in a database 33, or it can simply modify the Called Party BCD Number to correspond to the voice mail box number (e.g., changing the first digit to a predetermined digit in accordance with a procedure used by the network 32), and may then connect the calling party to the desired subscriber's voice mail facility in the voice mail system 32A. It should be noted that it is not necessary for the caller to have any knowledge of the subscriber's voice mail box number, or the format used by the network 32 for designating voice mail box numbers. All that the caller needs to know is the normal mobile telephone number of the subscriber, i.e., the number that the caller would normally dial in order to place a conventional voice call to the subscriber's mobile terminal.

As will be discussed below, other menus can be provided as well, such as an Open World Wide Web (WWW) menu for enabling the caller to reach a WWW (or some other network) homepage of a particular subscriber. In this case the caller would again simply be required to know or have stored the subscriber's mobile telephone number, and the network 32 would instead connect the incoming call to the subscriber's WWW homepage, based on the received Indication and the associated Called Party BCD Number. The actual URL address of the subscriber's homepage is not required to be known by the caller, but can instead be stored in the database 33 in association with the subscriber's Called Party BCD Number.

The teachings of this invention enable a public note facility to be employed, where a "post-it" note in, for example, Short Message Service (SMS) form is provided for others to access and read. In this case a target subscriber could enter a public SMS note (e.g., "Flying to L.A., will arrive at midnight", or "Tomorrow's meeting re-scheduled to Thursday, same time") which any mobile subscriber could read by calling the target subscriber's mobile telephone number from a "Read Notes" menu. A possibility exists to save a few of the most-used notes either in the mobile station 10 or in the network 32, and to activate a selected note from a list.

The teachings of this invention furthermore enable entirely new services to be offered, by allowing the provider of the service (the mobile subscriber) to charge callers. Examples include, but are not limited to, a horoscope in SMS format, a poem or quotation of the day, recipes, local weather reports, real-time bus and airline schedules, etc.

This invention benefits not only GSM 900 (900 MHz) systems, but also DCS 1800 and DCS 1900 systems, as well as other types of systems.

FIGS. 3–8 are signaling drawings of the different implementation methods for this invention. More particularly, FIGS. 3–5 relate to an I-signaling implementation of this invention, which is described first. It is noted that the following interactions will not occur if the network 32 is capable of indicating whether it supports APS in System Info Messages or by Cell Broadcasting. If the mobile station 10 knows that APS is not supported by the network 32, then it is preferred that the mobile station 10 does not initiate an APS call.

FIG. 3 shows the case where the network 32 does not support APS at all, and depicts normal mobile originated (MO) call signaling until the mobile station (MS) 10 is required to send the CC setup message. FIG. 3 also shows the case where the network 32 supports APS, but does not support the requested APS.

FIG. 4 shows the case where the network 32 supports the requested APS, but the requested APS is not provided or supported by the called, or target, subscriber. Again, normal MO call signaling occurs until the mobile station 10 is required to send the CC setup message.

FIG. 5 shows a case where the network 32 supports the requested APS, and the requested APS is provided by the target subscriber. Once more, normal MO call signaling occurs until the mobile station 10 is required to send the CC setup message.

For normal MO call signaling after CC Setup, the signaling depends on what type of call has been initiated with the I-signal (speech, SMS, data, etc.)

FIGS. 6–8 relate to an embodiment of this invention with the I-field in the CC Setup Message. As was the case for the I-signalling implementation described above in FIGS. 3–5, these interactions may not occur if the network 32 indicates whether it supports APS in System Info Messages or by Cell Broadcasting. If the mobile station 10 knows that APS is not supported by a particular network, then preferably it does not initiate an APS call in that network.

FIG. 6 shows the case where the network 32 does not support APS, or does support APS but not the requested APS. As before, normal MO call signaling occurs until the mobile station 10 is required to send the CC setup message.

FIG. 7 depicts a case where the network supports the requested APS, but the requested APS is not provided by the target subscriber. The normal MO call signaling occurs until the mobile station is required to send the CC setup message.

Finally, FIG. 8 shows the case where the network 32 supports the requested APS, and the requested APS is provided by the target subscriber. As in the case shown for FIGS. 3–7, the normal MO call signaling occurs until the mobile station 10 is required to send the CC setup message.

As in the cases of FIGS. 3–5, the normal MO call signaling after CC Setup depends on what type of call has been initiated with the I-signal (speech, SMS, data, etc.)

A further implementation can be based on the memory 24 of the mobile station 10. However, the signaling with this implementation does not differ significantly from normal GSM signaling, since the Called Party BCD Number (stored in the memory 24) grants access directly to the requested APS. For example, the called subscriber's voice mail number is stored in the memory 24, and can thus be dialed directly and an unconditional voice mail call is made to the voice mail facility for the subscriber.

As was indicated above, in one embodiment a new indication signal is added to conventional GSM signaling. The I-signal contains two fields. These are a Header Field to indicate to the network 32 that the mobile originated call must be handled as an APS call, and not as a normal speech or data call. A second new field is a Service Identification Field, which identifies the requested APS, i.e., which APS provided by the target subscriber is to be accessed.

As was made evident in FIGS. 3–5, the setting up of a mobile originated call proceeds in the normal fashion until such time as the mobile station 10 is required to transmit the Call Control (CC) Setup message. If the caller has initiated an APS request from one of the APS application menus (e.g., the Voice Mail APS menu 21 shown in FIG. 9), the I-signal is sent by the mobile station 10 before the Call Control Setup message. An I-timer 23 (see FIG. 1) can be reset and then started in order to prevent the mobile station 10 from waiting for too long for a response to the I-signal.

When the network 32 supporting APS receives the I-signal it sends an acknowledgement signal (IACK-signal) to mobile station 10. By receiving the IACK-signal the mobile station 10 is informed that the network 32 supports the requested APS, and that it is ready to deliver the APS if the desired service is provided by the target subscriber.

If the network 32 does not support APS at all then it does not recognize the I-signal, and no IACK-signal is sent back to the mobile station 10. In this case the I-timer 23 expires and the mobile station 10 terminates the call with an error message.

If the network 32 supports some limited APS, but not the requested APS, it detects the I-signal Header Field, decodes the Identification Field, and after which determines that the particular APS specified in the Identification Field is not supported. The network 32 can either send an affirmative "Requested APS Not Supported" message to mobile station 10, or it may do nothing, in which case the I-timer 23 expires and the mobile station 10 terminates the call with an error message.

After receiving the IACK the mobile station 10 sends a normal CC Setup message. At this time the mobile station 10 knows that it is initiating a legal APS call, and that the call is expected to be set up correctly. The network 32, having received and identified the I-signal and having responded with the IACK signal, is assumed to be prepared to attempt to connect the mobile originated call to the requested APS of the subscriber whose telephone number is included in the CC Setup message.

For the case where the network 32 supports the requested APS, but the called, target subscriber does not, the network 32 responds to the APS request with IACK, and the CC Setup message is then sent. On the basis of the Called Party BCD Number and the Identification field of the I-signal, the network 32 searches for the requested service in its resources but does not find it. The network 32 then may send the "Requested APS Not Supported" or a similar message to mobile station 10 and releases the channel.

In one embodiment any networks 32 that support APS may send an indication of their APS application menus for mobile station user access. If the mobile station 10 does not detect that the current network 32 supports APS from, for example, System Info Messages, it preferably removes or blocks user access to APS application menus until a valid APS support indication is detected from the network 32. Alternatively, the mobile station 10 may be configured so as not to remove the APS application menus, but instead to terminate an APS call attempt before initiating the radio connection if the network 32 does not support the desired APS function, as determined from the System Info Messages. In this manner the network operators may specify which APS functions they support, thereby enabling the mobile station 10 to remove or block access to only those APS menus that are not supported, and to retain those APS menus that are supported.

A mobile station 10 that supports APS may have a basic set of default APS menus 21 stored in the memory 24, as depicted in FIG. 1. Additional APS menus can be added as new APS functions and applications are offered by downloading them from the network 32 using, by example, known types of over the air programming techniques. The default APS menus 21 could be factory installed and/or installed by the operator when the mobile station is activated. They could reside as well in a memory module that is plugged into the mobile station 10, in a manner similar to the use of the SIM card. The APS menus could be loaded as well from a personal computer through a data connection to the mobile station 10, and in this manner could be downloaded from an Internet site.

By example, assume that a vendor offers a weather forecast APS service. The vendor may establish a WWW site where a potential user can log-on with a personal computer and download one or more APS menus from the vendor for storage in the personal computer memory. The downloaded menu(s) can then later be transferred to the mobile station 10 for storage in the memory 24. Alternatively, the user can log-in to the vendor's WWW site using the mobile station 10, and download a desired APS memory directly to the memory 24.

The network operator can provide information as to which APS functions it supports either by sending them as Cell Broadcasting, in System Info Messages or equivalent messages, or by providing a public note table which can be checked in SMS form and then responded to with a request to the network 32 to download a particular APS menu. The mobile station 10 may also be configured so that it loads all possible APS menus that the network 32 has indicated supported for in System Info Messages or by Cell Broadcasting. The mobile station 10 may provide a list on the display 20 of available APS functions, thereby enabling the user to select and/or delete specific ones of the APS menus, and/or to selectively download only certain APS menus.

The network operator can also provide an Information Service Center 35 (see FIG. 9) which could be queried as to which APS functions the subscribers of that operator were currently providing. An inquiry can then be made, such as in SMS form, to the Information Service Center 35, along with the phone number of the subscriber whose service is to be checked or obtained. The Information Service Center 35 then checks as to which APS functions the subscriber provides, and sends this information to the inquirer, such as in SMS form.

It should be noted that a particular user may designate all or some of his or her offered services as secret, i.e., not publicly available. In this case an inquiry as to the user's offered service(s) would be barred, and responded to with an error message or in some other appropriate way. The inquiry barring information may be stored in the infrastructure of the network 32, where it could be accessed and edited by the associated user using the mobile station 10, the Internet, or some other suitable technique. For this case the use of passwords and authentication may be desirable.

In a related manner, a particular user may set groups of user specified telephone numbers, and may give different access rights to different groups. For example, one group (comprised of one or more telephone numbers) may give access to one or more services not available from another group (e.g., members of project may have access to a list of project-related services not available to the general public), while another group may grant unrestricted access to a last of services certain services. In addition, one may set access rights to the services themselves, and not just to a listing of available services at the Information Services Center 35.

The foregoing has generally described the embodiment of FIGS. 3–5, i.e., adding the Indication signal (I-signal) to the normal GSM signalling. What follows is a more detailed discussion of the embodiment of FIGS. 6–8, i.e., adding the Indication field (I-field) to the Call Control (CC) Setup Message.

One difference between this latter implementation and the I-signal implementation described above is that the same information that is provided in the I-signal is included in the already existing Call Control Setup Message. The APS-related information is included in the CC Setup Message as a new field which basically contains the same two elements that are found in the I-signal: i.e., the Header field (possibly just one bit) to indicate to the network 32 that the CC Setup Message is for an APS, and the Identification field which specifies which APS the caller is attempting to access. An advantage of this approach is that no IACK signalling is needed: if the APS requested is possible to deliver the call will proceed, otherwise the call will terminate.

The above-mentioned I-timer 23 may be implemented to prevent long and costly wait periods while the network 32 searches for the requested APS. However, the call will terminate as well without the I-timer 23 if APS is not supported at all, or if the requested APS is not supported, or if the requested APS is not provided by the called party, since the mobile station 10 will not receive a standard Call Proceeding Message from the network 32.

A network 32 supporting APS detects the Header field in the CC Setup Message and is thus informed that the caller is initiating an APS call, instead of normal speech or data call. One bit of the Header field may be specified to indicate if an APS request is being sent: if the bit is 1 APS is requested, and the I-field includes essential information for setting up the call. If the Header field bit is 0 then APS is not active, the CC Setup is handled normally, and the network 32 ignores the rest of the I-field information.

Table 1 shows one suitable format for an n-bit I-field as part of the CC Setup Message, and assumes one bit for the Header field and (n-1) bits for the Information field.

TABLE 1

| HEADER FIELD | INFORMATION FIELD |
|---|---|
| bit 1 | bits 2-n |
| APS REQUEST yes/no | type of APS being requested |

It can be appreciated that certain networks 32 that do not support APS may not recognize the presence of this APS-related information in the CC Setup Message. In this case, if the call being initiated is an APS call then it will be terminated either because the mobile station 10 does not receive the Call Proceeding Message, or the network 32 does not recognize the I-Field bits.

In order to prevent abnormal termination of normal call setups by a network rejecting the CC Setup Message having the unknown I-field, when setting up a normal call the mobile station 10 may send a conventional CC Setup Message with no I-field. In this case the mobile station 10 adds the I-field to the CC Setup Message only when initiating an APS call.

Further in this regard, in the I-field implementation it is possible to handle the normal speech/data call situation by at least two different techniques.

In a first technique, already discussed, when initiating a normal call the mobile station 10 sends a normal CC Call Setup message to the network 32.

In accordance with a second technique, the mobile station 10 may instead send a modified CC Call Setup message, including the I-field, even if a normal call is desired. This implies that the I-field be specified as Optional Data in the signaling specifications of the system. In this case the Header Bit of the I-field is set to zero in order to indicate that APS is not active. A network supporting APS will correctly interpret this condition and will thus route the call as a normal speech call. A network not supporting APS will simply ignore the unknown I-field, since it is Optional Data as opposed to Mandatory Data, and the call will be routed as a normal speech call (unless any information in any registers 32a of the network 32 overrides this, as discussed in further detail below).

Assuming that the network 32 supports the desired APS it begins searching for the requested APS of the called party from its resources and sends the Call Proceeding Message to the mobile station 10 after receiving the I-field CC Setup Message. If the network 32 supports some APS functionality, but not the requested APS, it detects the I-field Header and decodes the I-field Identification part, after which it determines that the requested APS is not supported. As was discussed above, the network 32 may either send an affirmative "Requested APS Not Supported" message to mobile station 10, or it may do nothing, in which case the I-timer 23 expires after the mobile station 10 does not receive the Call Proceeding Message, and the call is terminated.

As in the above-described I-signal implementation, the network 32 can send an indication of their APS support in System Info Messages or on the Cell Broadcasting channel. The above-mentioned Information Service Center 35 can also be provided.

As opposed to relying on the network operator's resources in connecting the requested APS correctly to voice mail, personal notes, WWW site addresses, etc., the information regarding the access keys to these services can be stored on a SIM card or in the memory 24. It is presently known to permit more than one phone number to be stored per name in the memory 24 of the mobile station 10. This feature can thus be extended to other numbers or to addresses other than normal phone numbers. In this case the user saves for each name in the memory 24 at least one other number of other information which grant access to at least one APS function offered by the associated name.

This approach requires the user to have knowledge of the standards of each network operator, and to also keep these standards current. This can be facilitated if each network operator offers "a public roadmap", a service for users to access which provides information regarding the current standards of that operator as to how a phone number must be altered if one wants to make a call to the associated voice mail, personal note, etc.

The foregoing has described a number of embodiments of the teaching of this invention. It can be appreciated that the embodiment of FIGS. 3–5 enables an APS-related inquiry to be made of the network 32, and depending on the presence or absence of a response then further APS-related activity can occur or may not occur. Furthermore, the embodiment of FIGS. 3–5 (as well as FIGS. 6–8) does not require that the mobile station 10 user know the actual telephone number or other access information for a particular desired APS provider. All that is necessary is that the user be able to specify what type of service is desired (e.g., voice mail, a weather forecast. etc.), and the network 32 assumes the responsibility of making the connection, or of providing a list of potential APS providers.

It can be appreciated that the operator of the network 32 may derive income from APS providers that desire to be listed by the network 32.

As a further example of the utility of this invention, assume that the mobile station 10 roams into the network 32 from another city. Further assume that the user desires to call a taxi. The user can simply access a "Taxi Required" APS menu, the result of which causes either the I-signal or the modified CC Setup Message to be sent to the network operator 32. After determining that the user has transmitted a Taxi Required APS message, the network 32 looks up in the database 33 a taxi company telephone number and connects the call to the mobile station 10.

This embodiment can be made location sensitive, as the network 32 can determine the approximate location of the mobile station 10 using conventional techniques, such as the location of the base station 30. In this case a mobile station 10 calling from an airport location may be connected to Taxi Company A, while a mobile station 10 calling from a downtown location may be connected to a taxi company B.

If the embodiment of FIGS. 6–8 is used the CC Setup Message can contain a dummy Called Party BCD Number, as the network 32 will detect that the call is actually a Taxi Request APS, and can ignore the telephone number portion.

The Taxi Request APS is but one example of the utility of this invention. As another example, consider again the roaming case and a "Restaurant Reservation" APS menu. By invoking this menu the user can be given a choice of food (e.g., French, Italian, Steak House, etc.) and/or restaurant type (e.g., Casual, Formal, Family, etc.) and/or time (e.g., Lunch, Dinner, Late Dinner, etc.) By making a selection a suitable APS request is formulated by the controller 18 of the mobile station 10 and sent to the network 32. After decoding the APS request the network 32 looks up in the database 33 the contact number (e.g., a reservations-only number) for the specified type of restaurant, and then connects the user of the mobile station 10 to the selected restaurant. This type of operation can be made location sensitive as well, as a Restaurant Reservation APS specifying an informal Italian restaurant that is made in the downtown area of a city may be connected to a different restaurant that the same Restaurant Reservation APS made in a suburban area.

This type of operation can thus be made time or data sensitive also. For example, assume that Italian restaurant A is closed on Mondays, and the user makes the Restaurant Reservation APS request on a Monday. In this case restaurant A is not selected from the database 33, assuming that the days of operation information is made available in the database 33, and Italian restaurant B can be selected instead. Likewise, if the user indicates that he or she desires to make a lunch reservation when interacting with the Restaurant Reservation APS menu, then Italian restaurant C may be selected, as the database may indicate that restaurant B only serves dinner.

Both implementation methods discussed above, the I-signal and adding an I-field to an already existing CC Call Setup message, can be used to practice this invention. However, when considering different roaming situations there are some differences between the two methods. These differences are now discussed in further detail.

In a first case assume that the caller is camped on a network which supports APS, and the service requested by a user is located in a network that does not support APS.

For the I-signal method, the I signal is sent to the network 32. The network 32 supports APS and therefore can correctly interpret the I-signal. Since the call is destined for another network, the service requested is not in the database of the first network 32. The first network 32 routes the call to the target network with an I-flag on for indicating that this is not a normal speech/data call, but is instead an APS request. Since the target network does not understand the I-flag, the call is most likely terminated. The network 32 that the mobile station 10 is camped on (network 32 with APS support) does not receive the reply from the target network and determines that the target network does not support APS. An appropriate error message can then be sent to the mobile station 10.

The operation of the I-field method is basically the same as that described above. A CC call set up message is sent to the network 32 that then routes the call to target network. Since the target network does not understand the request the call is terminated, and the first network 32 returns an error message to the mobile station 10.

In a second case assume that the caller is camped on a network which does not support APS, and the service requested by the user is located in a network that does support APS.

For the I-signal method the first network 32 receives the APS request using the I-signal. Since the first network 32 does not support APS, the call may be terminated before the first network 32 obtains the information about which network the call should be routed to.

Since the first network 32 is not informed until the CC Call Setup message as to which network the call is going, it assumes that the called number is a customer of the first network 32. Since the information about the call destination is in the CC Call Setup message, the first network 32 may never see the destination as it may automatically terminate all APS calls. Further, the database used for converting normal phone numbers to the number which connects the call to the desired service is in the target network. The APS request will be terminated by the first network 32 even if the target network 32 would basically be able to connect the call to the desired service. When any given network receives a message that it does not recognize, the network typically terminates the call, and this may occur for an APS call to a non-APS network, since the network 32 does not recognize the I-signal. For the reasons discussed above, and in a practical roaming situation, the I-signal method may be less preferred than the I-field method.

Discussing now the I-field method, the CC Call Setup message now contains: (a) the I-field indicating that the call is an APS request, and identifying the desired service and (b), the called party telephone number. The data in the CC Call Setup message is divided into three different classes in the GSM specifications; mandatory, conditional and optional.

Mandatory data of the CC Call Setup message must be correctly decoded and fully understood by the network 32, otherwise the call will be terminated. However, as long as the mandatory data portion is correctly presented to the network 32, the call will not be terminated.

Any optional data in the CC Call Setup message is ignored by the network 32 if the network 32 does not understand the data. As such, with the I-field method the first network 32 would correctly decode the mandatory data of CC Call Setup message, including the target network and the telephone number where the APS request should be routed. The network 32 will also ignore the I-field portion of the CC Call Setup message because it does not recognize the I-field. On the basis of the data received in the CC Call Setup message the first network 32 would then handle the APS request as a normal speech call. However, the information necessary for routing the call to the correct service can be stored in, for example, one of the registers 32a in the network infrastructure (see FIG. 2), thereby allowing the first network 32 to combine the data from the setup message with the data from the register(s) 32a as a successful APS request, which is then routed to the target network.

The network 32 registers 32a typically include a user profile for each mobile station 10 camped on the network 32, and any information required for correctly completing APS calls can be stored in these registers 32a as well. Those skilled in the art will understand how these network registers 32a can be programmed and employed for APS purposes, when guided by the foregoing teachings.

By way of summary, and returning now to the first case discussed above, assume again that the caller is camped on a network which supports APS, and that the service requested by the user is located in a network that does not support APS. As before, if the target network does not support APS then the request cannot be honored, regardless of which method (I-signal or I-field) is used. However, in the second case the roaming becomes an issue only when a non-APS network is located between the mobile station 10 and the target APS network. The I-signal implementation works well when all of the networks involved in routing the APS request support APS, while the I-field method can be employed in all or substantially all cases. Furthermore, the I-field method requires fewer changes to world wide signalling specifications.

As such, the presently preferred implementation with current systems, such as TDMA systems, is the I-field rather than the I-signal method. However, in future systems the I-signal method can be specified as a part of the system from the beginning, thus avoiding any potential roaming issues.

It should be appreciated that the foregoing teachings have applicability to existing networks and mobile stations, as well as to future wireless networks and systems. For example, future systems are expected to offer video call capabilities using miniature video cameras that could be incorporated into the mobile station 10. The expected growth in the bearing capabilities of networks, as well as the growth of the user base of wireless terminals and the interconnection between the Internet and wireless communications systems and network will provide many opportunities for various services to offered. This being the case, providing access solutions to these services will become a significant issue, to which the teachings of this invention can be applied with advantage.

Thus, it should thus be appreciated that while the invention has been particularly shown and described with respect to preferred embodiments and various examples thereof, those skilled in the art may derive changes in form and details to these embodiment, especially when guided by the foregoing detailed description and drawings. However, any such modifications would be made without departing from the scope and spirit of this invention. The teaching of this invention should thus not be construed to be limited by the foregoing description, but should instead be given a scope commensurate with the scope of the following claims, and any and all equivalents thereof.

What is claimed is:

1. A method for operating a wireless telecommunications system, comprising steps of:
   formulating a request in a mobile station for a particular type of service offered by a network for a particular subscriber or offered by another party;
   transmitting the request to the network over a radio channel, the request being transmitted as part of mobile station call origination signalling and separate from a called party telephone number;
   interpreting the request and, based on the interpretation, determining contact information for a destination location that will fulfil the request; and
   using the determined contact information, connecting the mobile station to the destination location.

2. A method as in claim 1, wherein the contact information is comprised of a telephone number.

3. A method as in claim 2, wherein the step of determining includes a step of looking up the telephone number in a database.

4. A method as in claim 2, wherein the step of determining includes a step of generating the telephone number by modifying a first telephone number that was transmitted with the request.

5. A method as in claim 2, wherein the destination location is a voice mail system, where the step of determining includes a step of generating a voice mail telephone number for a particular subscriber by modifying another telephone number of the subscriber that was transmitted with the request.

6. A method as in claim 1, wherein the contact information is comprised of an address of an entity coupled to a data communications system that is reachable through said network.

7. A method as in claim 1, wherein the request is transmitted prior to transmitting a call connect setup message from the mobile station to the network.

8. A method as in claim 1, wherein the request is transmitted as a part of a call connect setup message sent from the mobile station to the network.

9. A method as in claim 1, wherein the request is comprised of at least one bit for indicating that the request is a request formulated by the mobile station for a particular type of service, and a plurality of bits for indicating the type of requested service.

10. A method as in claim 1, wherein the step of formulating comprises a step of displaying a menu to the user, and wherein information conveyed by the transmitted request is based at least in part on the type of menu that was displayed and on the user's interaction with the displayed menu.

11. A wireless telecommunications system, comprising:
    a mobile station comprising a user interface and a controller for formulating a request for a particular type of service offered by a network for a particular subscriber or offered by another party;
    said mobile station further comprising a transmitter for sending the request to the network over a radio channel, the request being transmitted as part of mobile station call origination signalling and separate from a called party telephone number; and
    a receiver and interpreter in said network for interpreting the request and, based on the interpretation, for determining contact information for a destination location that will fulfil the request, said network being responsive to the determined contact information for connecting the mobile station to the destination location.

12. A system as in claim 11, wherein the contact information is comprised of a telephone number.

13. A system as in claim 12, wherein said network further comprises a database coupled to said interpreter, and wherein said interpreter looks up the telephone number in said database.

14. A system as in claim 12, wherein said interpreter generates the telephone number by modifying a first telephone number that was transmitted with the request.

15. A system as in claim 12, wherein the destination location is a voice mail system, and wherein said interpreter generates a voice mail telephone number for a particular subscriber by modifying another telephone number of the subscriber that was transmitted with the request.

16. A system as in claim 11, wherein the contact information is comprised of an address of an entity coupled to a data communications system that is reachable through said network.

17. A system as in claim 11, wherein the request is transmitted prior to transmitting a call connect setup message from said mobile station to said network.

18. A system as in claim 11, wherein the request is transmitted as a part of a call connect setup message transmitted from said mobile station to said network.

19. A system as in claim 11, wherein the request is comprised of at least one bit for indicating that the request is a request formulated by said mobile station for a particular type of service, and a plurality of bits for indicating the type of requested service.

20. A system as in claim 11, wherein said controller operates with said user interface for displaying a menu to the user, and wherein information conveyed by the transmitted request is based at least in part on the type of menu that was displayed and on the user's interaction with the displayed menu.

21. A system as in claim 11, wherein said network further comprises an information service center that is responsive to inquiries for providing an indication of offered services.

22. A system as in claim 21, wherein said information service center responds to inquiries so long as a particular listed service is not indicated as having restricted access rights.

23. A system as in claim 22, wherein said information service center responds to an input for setting and removing restrictions of the access rights.

24. A method for operating a wireless telecommunications system, comprising steps of:

formulating a request in a mobile station for a particular type of service offered by a network for a particular subscriber or offered by another party;

transmitting the request to the network over a radio channel, the request being transmitted as part of mobile station call origination signalling and separate from a called party telephone number, wherein the request is one of transmitted prior to transmitting a call connect setup message from the mobile station to the network, or is transmitted as a part of a call connect setup message sent from the mobile station to the network;

interpreting the request and, based on the interpretation, determining contact information for a destination location that will fulfil the request; and using the determined contact information, connecting the mobile station to the destination location.

25. A method as in claim 24, wherein the request is comprised of at least one bit for indicating that the request is a request formulated by the mobile station for a particular type of service, and a plurality of bits for indicating the type of requested service.

26. A method as in claim 24, wherein for the case where the request is transmitted as a part of the call connect setup message sent from the mobile station to the network, the request is transmitted as Optional Data.

27. A method as in claim 26, wherein the request is used in conjunction with information stored in a network register for that mobile station.

28. A method as in claim 24, wherein for normal mobile station originated call signaling after transmitting the call connect setup message, the particular signaling depends on what type of call has been initiated.

29. A method as in claim 24, wherein the steps of interpreting the request and determining contact information further consider at least one of a location of the mobile station from where the request was transmitted, a time that the request was transmitted, or a date that the request was transmitted.

30. A method as in claim 24, and further comprising an initial step of receiving and storing in the mobile station an indication of what service types are supported by the network.

31. A method as in claim 30, wherein at least the step of transmitting is inhibited if a desired type of service is not supported.

32. A method as in claim 30, wherein the step of receiving receives the indication of service types from the network through a radio channel.

33. A method as in claim 30, wherein the step of receiving receives the indication of service types from the network through a data communication network.

34. A method as in claim 30, wherein the step of receiving receives the indication of service types from an Internet site.

35. A method for operating a wireless telecommunications system, comprising steps of:

formulating a request in a mobile station for a particular type of service offered by a wireless network provider or offered by another party reachable through the wireless network provider;

transmitting the request to the wireless network provider over a radio channel, the request being transmitted as part of mobile station call origination signalling and without transmitting a called party telephone number, wherein the request is one of transmitted prior to transmitting a call connect setup message from the mobile station to the wireless network provider, or is transmitted as a part of a call connect setup message sent from the mobile station to the wireless network provider;

interpreting the request and, based on the interpretation, determining contact information for a destination location that will fulfil the request; and using the determined contact information, enabling the mobile station to be connected to the destination location.

36. A method as in claim 35, wherein at least one of the steps of interpreting the request and determining contact information further consider at least one of a location of the mobile station from where the request was transmitted, a time that the request was transmitted, or a date that the request was transmitted.

37. A wireless telecommunications system, comprising at least one mobile station and a wireless network provider, comprising:

a controller in said mobile station for formulating a request for a particular type of service offered by said wireless network provider or offered by another party reachable through said wireless network provider;

a transmitter in said mobile station for transmitting the request to said wireless network provider over a radio channel, the request being transmitted as part of mobile station call origination signalling and without transmitting a called party telephone number, wherein the request is one of transmitted prior to transmitting a call connect setup message from the mobile station to said wireless network provider, or is transmitted as a part of a call connect setup message sent from the mobile station to said wireless network provider;

a controller that comprises part of said wireless network provider for interpreting the request and, based on the interpretation, for determining contact information for a destination location that will fulfil the request and, using the determined contact information, for enabling said mobile station to be connected the destination location.

38. A system as in claim 37, wherein the wireless network provider controller, when at least one of interpreting the request and determining contact information, further considers at least one of a location of the mobile station from where the request was transmitted, a time that the request was transmitted, or a date that the request was transmitted.

* * * * *